(12) United States Patent
Pierret

(10) Patent No.: US 6,798,176 B2
(45) Date of Patent: Sep. 28, 2004

(54) ALTERNATOR FOR A MOTOR VEHICLE WITH ENERGIZING INFORMATION OUTPUT

(75) Inventor: Jean-Marie Pierret, Paris (FR)

(73) Assignee: Valeo Equipements Electriques Moteur, Creteil (FR)

( * ) Notice: Subject to any disclaimer, the term of this patent is extended or adjusted under 35 U.S.C. 154(b) by 145 days.

(21) Appl. No.: 10/275,007

(22) PCT Filed: Mar. 1, 2002

(86) PCT No.: PCT/FR02/00751

§ 371 (c)(1),
(2), (4) Date: Oct. 31, 2002

(87) PCT Pub. No.: WO02/071570

PCT Pub. Date: Sep. 12, 2002

(65) Prior Publication Data

US 2003/0128014 A1 Jul. 10, 2003

(30) Foreign Application Priority Data

Mar. 2, 2001 (FR) ............................................. 01 03270

(51) Int. Cl.[7] ........................... H02H 7/06; H02P 11/00; H02P 9/00
(52) U.S. Cl. ......................................... 322/28; 322/24
(58) Field of Search ............................ 322/20, 24, 26, 322/28; 363/37, 34, 36, 41, 95, 97, 98; 323/313

(56) References Cited

U.S. PATENT DOCUMENTS

| | | | | |
|---|---|---|---|---|
| 5,264,779 A | * | 11/1993 | Satoh et al. ................... | 322/28 |
| 5,285,146 A | * | 2/1994 | Pierret et al. .................. | 322/25 |
| 5,294,881 A | * | 3/1994 | Pierret et al. .................. | 322/28 |
| 5,309,083 A | * | 5/1994 | Pierret et al. ................ | 323/313 |
| 5,731,696 A | * | 3/1998 | Pennisi et al. ............... | 323/313 |
| 6,031,360 A | * | 2/2000 | Pierret .......................... | 322/99 |
| 6,034,512 A | * | 3/2000 | Pierret .......................... | 322/99 |
| 6,081,103 A | * | 6/2000 | Pierret .......................... | 322/36 |

* cited by examiner

*Primary Examiner*—Nicholas Ponomarenko
*Assistant Examiner*—Julio C. Gonzalez
(74) *Attorney, Agent, or Firm*—Liniak, Berenato & White

(57) ABSTRACT

An alternator for a motor vehicle comprises an excitation regulator circuit comprising a controlled switch (Tex) in series with the excitation winding, and a freewheel component (DL) which is connected to the terminals of the winding, and a circuit (10, 20, 30) for delivering information (Is1; Is2) representative of the state of excitation (Iexc) of the alternator.

According to the invention, this circuit comprises:

a means (10) for generating, while the switch is in the on state, a first signal (U1) proportional to the current (Iex) flowing through it; and a means (20) for generating a second signal (U2), this means being capable, while the switch is on, of generating the second signal on the basis of the first signal and, while the switch is off, of generating the second signal by storing (CD) the first signal which existed before the said switch was turned off.

17 Claims, 2 Drawing Sheets

ALTERNATOR FOR A MOTOR VEHICLE WITH ENERGIZING INFORMATION OUTPUT

TECHNICAL FIELD OF THE INVENTION

The present invention relates in general to alternators or alternator/starters of motor vehicles and, more particularly, to a device intended to produce a signal representative of the excitation current flowing through the rotor of such a rotary machine.

Prior Art

It is now conventional to equip a motor-vehicle heat engine with an electronic engine-monitoring device intended to continuously adjust the engine's supply as a function of various measured conditions, and/or to [sic] an electronic device for supervising the activation and deactivation of electrical loads of the vehicle, which device is intended to keep the load on the alternator below a maximum level.

One of these conditions is the degree of excitation of the alternator or alternator/starter of the vehicle, which is itself representative of the braking torque applied by the alternator or alternator/starter to the heat engine. Hence, when such a measurement reflects a high resistive torque which is liable to stall the engine, the engine-monitoring device enriches the supply mixture of the engine in order to avoid maintaining [sic] a sufficient idling speed and to avoid the above-mentioned stalling. Alternatively, instruments which consume electricity from the on-board network of the vehicle may be temporarily disconnected.

Conventionally, the degree of excitation of the alternator is given by the profile of the excitation-control signal (typically a pulse-width modulation PWM signal) applied to the power semiconductor which, in combination with a freewheel diode, determines the current in the excitation winding.

There are hence solutions for providing the engine-monitoring device with this signal, either directly or in the form of an analogue or digital value representative of it. In particular, output signals conventionally referred to as "FR" for "field response" or "DF" for "digital field", which are intended for the engine-monitoring device, are known. Document FR-A-2 695 269 in the name of the Applicant Company describes, in particular, a device for generating an "FR" signal.

However, all the known devices which generate a signal based on the excitation-control signal are susceptible to the inherent variations in the effective excitation current as a function of temperature. More precisely, it is found that the ohmic resistance of the excitation winding varies very significantly as a function of temperature, and indeed a variation in this resistance by about 70% is typically observed when the temperature of the winding changes from 25° C. (cold running) to 200° C. (order of magnitude for hot running).

This variation in resistance greatly alters the actual excitation current Iexc for a given excitation-control signal. In a similar way, a particular current may correspond to very different profiles of the excitation-control signal, and therefore of the corresponding FR or DF signal, depending on whether a low temperature or a high temperature is involved.

Of course, an image of the effective current in the excitation winding could be obtained by employing a shunt in series with the winding, and by measuring the voltage across the terminals of this shunt. However, this would entail significant problems of, on the one hand, representativity of the measurement since the ohmic value of the shunt varies significantly with temperature, and, on the other hand, of heat dissipation which, in particular, prevents the shunt from being produced monolithically.

OBJECT OF THE INVENTION

It is an object of the present invention to generate a signal representative of the current actually flowing through the excitation winding of an alternator, by using means which are suitable for being integrated monolithically, in particular with an excitation regulator, and in a way which is reliable and stable as a function of temperature.

To that end, the present invention provides, according to a first aspect, an alternator for a motor vehicle, comprising a circuit for regulating the current flowing through an excitation winding of the said alternator, the said regulator circuit comprising a switch which is controlled to be in the on mode or in the off mode and is in series with the excitation winding, and a freewheel component with one-way conduction which is connected to the terminals of the excitation winding, and a circuit for delivering, on an output, information representative of the state of excitation of the alternator, characterised in that the said circuit for delivering information representative of the state of excitation of the alternator comprises:

- a means for generating, while the controlled switch is in the on state, a first signal proportional to the current flowing through the said controlled switch; and

- a means for generating a second signal, this means being capable, while the controlled switch is in the on state, of generating the second signal on the basis of the first signal and, while the controlled switch is in the off state, of generating the second signal by storing the first signal which existed before the said controlled switch was turned off.

- the current-measurement circuit includes means for keeping the three terminals (source, drain and gate [lacuna] of the excitation and measurement transistors at respectively identical potentials.

It will be noted here that the term "alternator" in the description above is intended to mean not only alternators per se, but also alternators which are capable of operating as a motor, such as alternator/starters.

Preferred, but non-limiting, aspects of the alternator according to the invention are as follows:

- the means for generating the first signal comprises a current-mirror circuit comprising a first semiconductor switch, constituting the said controlled switch, and a second semiconductor switch.

- the first and second semiconductor switches comprise first and second transistors made from identical elementary cells.

- the second transistor comprises a number of elementary cells equal to a small fraction of the number of elementary cells of the first transistor.

- the means for generating the first signal furthermore comprises a means for converting the current passing through the second semiconductor switch into a voltage, the said voltage constituting the first signal.

- the means for generating the second signal comprises a means capable of generating digital information representative of the first signal while the controlled switch is in the on state, and a means for selectively storing the said digital value from the moment when the controlled switch becomes turned off.

the means for selectively storing the digital value comprises an incrementation/decrementation circuit which, on an input, receives a turn-off signal established on the basis of the current in the controlled switch becoming zero.

the means for generating the second signal furthermore comprises a comparator, which, on a first input, receives the first signal and, on a second input, receives an analogue signal obtained by conversion of the said digital information, and whose output is addressed to an input of the said incrementation/decrementation circuit intended to determine the direction of incrementation/decrementation.

the alternator furthermore comprises:
  a means for generating, on an output terminal, a third signal which results from the said second signal and constitutes the said information representative of the state of excitation of the alternator.

the means for generating the third signal comprises a means for converting the second signal into an output current.

the means for generating the third signal also comprises a means for converting the output current into a reverse output current, and a selector capable of selectively operating the output-current conversion means.

the output-current conversion means comprises a current-mirror circuit.

the circuit for delivering information representative of the state of excitation of the alternator is produced monolithically.

the said circuit for delivering information representative of the state of excitation of the alternator is produced monolithically with the regulator circuit.

According to a second aspect, the present invention provides a regulator circuit intended to monitor the current flowing through an excitation winding of an alternator, the said regulator circuit comprising a switch which is controlled to be in the on mode or in the off mode and is intended to be connected in series with the excitation winding, and a freewheel component with one-way conduction which is intended to be connected to the terminals of the excitation winding, and a circuit for delivering, on an output, information representative of the state of excitation of the alternator, characterised in that the said circuit for delivering information representative of the state of excitation of the alternator comprises:
  a means for generating, while the controlled switch is in the on state, a first signal proportional to the current flowing through the said controlled switch;
  a means for generating a second signal, this means being capable, while the controlled switch is in the on state, of generating the second signal on the basis of the first signal and, while the controlled switch is in the off state, of generating the second signal by storing the first signal which existed before the said controlled switch was turned off.

Lastly, the invention provides, according to a third aspect, a circuit intended to deliver, on an output, information representative of the state of excitation of an alternator, the said circuit being intended to interact with a regulator circuit, which is itself intended to monitor the current flowing through an excitation winding of the said alternator and comprises a switch which is controlled to be in the on mode or in the off mode and is in series with the excitation winding, and a freewheel component with one-way conduction which is connected to the terminals of the excitation winding, characterised in that it comprises:
  a means for generating, by coupling with the controlled switch and while the latter is in the on state, a first signal proportional to the current flowing through the controlled switch;
  a means for generating a second signal, this means being sensitive to the on or off state of the controlled switch and being capable, while the controlled switch is in the on state, of generating the second signal on the basis of the first signal and, while the controlled switch is in the off state, of generating the second signal by storing the first signal which existed before the said controlled switch was turned off.

BRIEF DESCRIPTION OF THE DRAWINGS

Other aspects, objects and advantages of the present invention will become more clearly apparent on reading the following detailed description of a preferred embodiment thereof, which is provided by way of non-limiting example and is given with reference to the appended drawings, in which.

DESCRIPTION OF A PARTICULAR EMBODIMENT

Figure 1:
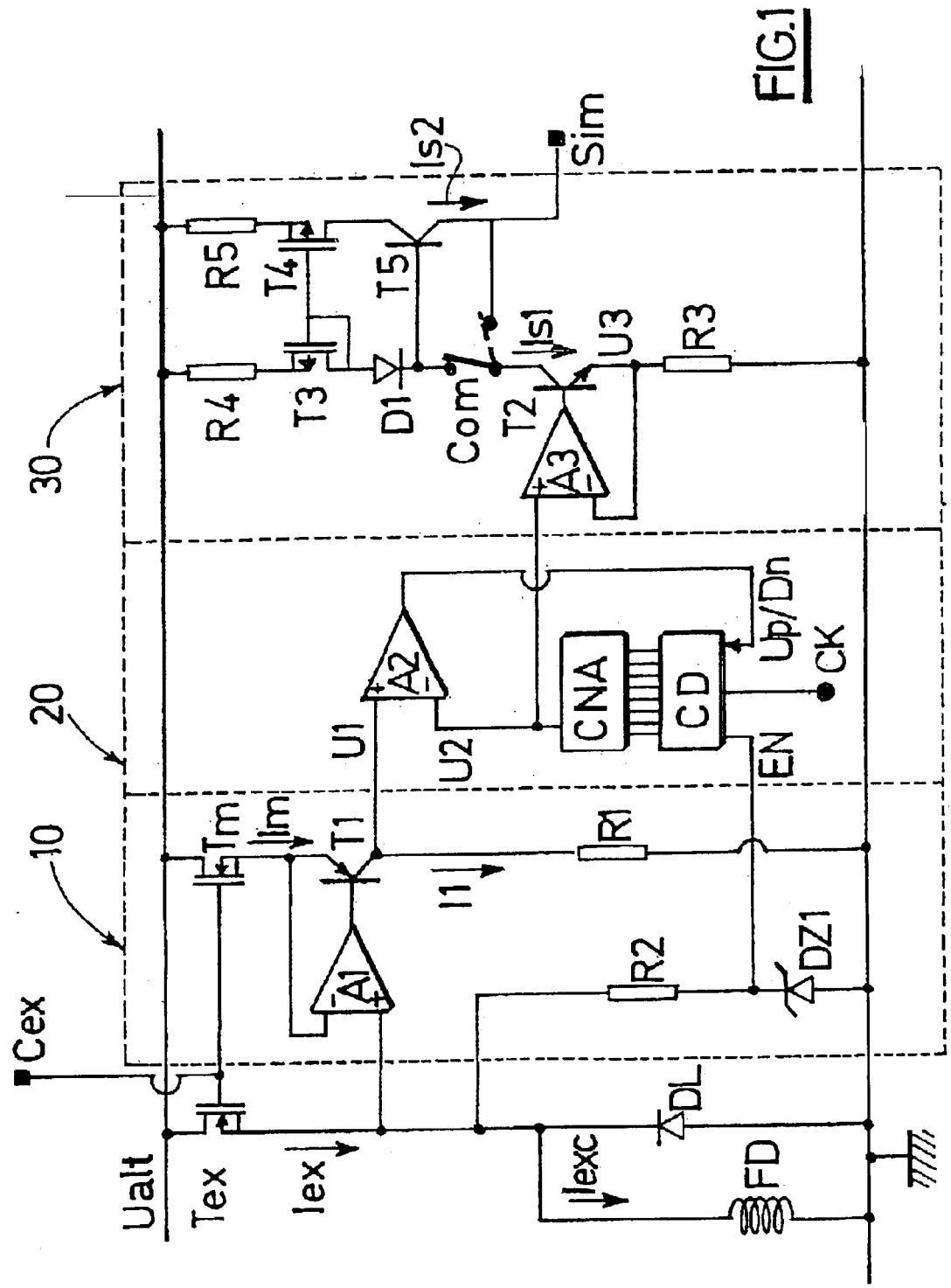
FIG. 1 shows the diagram of a circuit according to the present invention.

Referring to FIG. 1, a circuit has been represented which comprises, in its part which is on the left in the figure, and in a manner which is conventional per se, a winding FD constituting the excitation winding or rotor winding of a motor-vehicle alternator or alternator/starter, a power transistor Tex, preferably in MOS technology, connected in series with the winding FD between the output voltage Ualt of the alternator (corresponding to the battery voltage) and the reference earth. A freewheel diode is mounted in antiparallel with the winding FD.

The current which flows through the transistor Tex is denoted Iex, whereas the current which actually flows through the winding FD is denoted Iexc. These two currents are illustrated respectively by solid lines and by dashes in FIG. 2.

Figure 2:
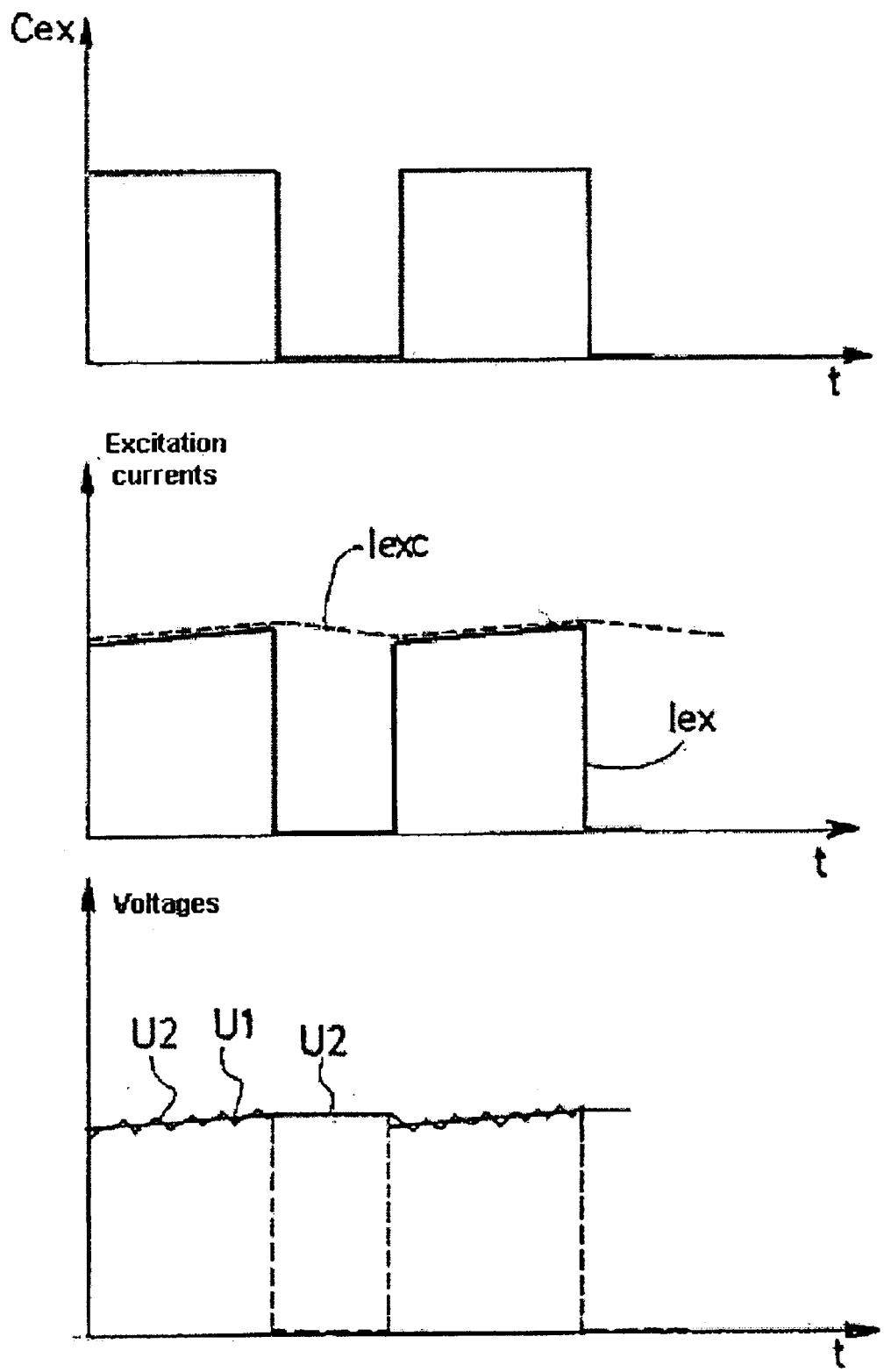
FIG. 2 illustrates the profile of an excitation-control signal, an excitation current, a current passing through an excitation-control switch, as well as two voltages involved in the circuit of FIG. 1.

Also conventionally, the gate of the transistor Tex receives an excitation-control signal Cex, consisting of a pulse-width modulation signal whose profile is also illustrated in FIG. 2.

It can be observed in FIG. 2 that, owing to the smoothing effect of the inductance of the winding FD, the current Iexc has a very small ripple component. For its part, the current Iex is chopped by the transistor Tex, and it is only at the times when Tex is closed that the currents Iex and Iexc are superimposed.

The device according to the invention comprises three main parts, namely a circuit 10 for measuring current in the transistor Tex, a circuit 20 for storing the measured value, and an output circuit 30 capable of delivering signals representative of the level of the excitation current Iexc.

The circuit 10 firstly comprises a transistor Tm mounted as a current mirror with the transistor Tex. This transistor TM has its source connected to the voltage Ualt and its gate connected to the gate of Tex.

The transistor Tm is therefore capable of replicating, as a current Im and with a predetermined fixed attenuation coefficient, the current Iex flowing between the source and the drain of Tex. For example, this coefficient is 1/1000.

Advantageously, in order to ensure good proportionality between the currents Iex and Im, the transistor Tm is produced with the same basic cells as the power transistor Tex. In the example selected here, it is sufficient to use a number of elementary cells to produce Tm which is equal to one thousandth of the number of elementary cells of the transistor Tex.

Proportional replication of the current Tex in Tm requires that the three terminals of each transistor be respectively at the same potentials. It was seen above that the sources and the gates of the transistors are connected together. As regards the drain potentials, it can be observed in FIG. 1 that the drains are connected together by means of the inverting and non-inverting inputs of an operational amplifier A1, which has the inherent property of keeping its two inputs at the same potential. The condition for proportional replication is therefore satisfied.

The drain of Tm is furthermore connected to the emitter of a PNP bipolar transistor T1, the base of which is addressed by the output of A1. The measurement circuit 10 furthermore comprises a resistor R1, connected between the collector of T1 and the reference earth, and a resistor R2 and a clipping Zener diode DZ1, both of which are mounted in series between the drain of Tex and the reference earth. The collector of T1 is also connected to the non-inverting input of an operational amplifier A2, which, by definition, draws no current.

The current I1 on the collector of T1 is therefore equal to the current Im, to within the base current of T1 which will be neglected here.

Across the terminals of R1, this current produces a voltage U1 equal to R1×I1, and it will be understood that this voltage U1 is in the form of a signal with the same waveform as, and a level proportional to, the current Iex in Tex.

On their common terminal, the resistor R2 and the clipping diode DZ1 (whose reverse breakdown voltage is preferably selected to be equal to 5 volts) generate a logical signal EN representative of the open or closed state of the transistor Tex. Thus, if Tex is closed, a current flows through R2 and DZ1 and the signal EN is at the logical level "1"; if, however, Tex is open, a reverse current flows through SZ1 [sic] and R2, and the logical signal EN lies at a small level below the zero volts of the reference earth, a level corresponding to the junction voltage of DZ1, i.e. typically −0.8 volts, which constitutes a logical level "0".

The storage circuit 20 firstly comprises an incrementation/decrementation circuit CD, the parallel outputs of which (for example over eight bits) are connected to the parallel inputs of a digital/analogue converter CNA. The circuit 20 also comprises an input for a clock signal CK (or, as a variant, an internal clock) which sets the timing of the incrementation and decrementation carried out by the circuit DC [sic]. The operational amplifier A2, which is mounted as a comparator, receives, on its non-inverting input (as mentioned), the voltage U1 and, on its inverting input, the voltage U2 e [sic] output of the converter CNA. The purpose of the comparator A2 is to generate a logical signal Up/Dn for the direction of incrementation/decrementation, which is applied to the corresponding input of the incrementer/decrementer CD.

This storage circuit 20 functions as follows:
if Tex is open, the signal EN is at the logical level "0", so that the incrementer/decrementer CD is frozen; the voltage U2 therefore remains at a constant value;
if Tex is now closed, the signal EN is at the logical level "1" in order to activate the incrementation/decrementation in CD; there are then two possibilities:
if U2<U1, the output of A2 is at the logical level "1", which corresponds to incrementation in the circuit CD; the value of U2 therefore increases to approach U1;
if, however, U2>U1, the output of A2 is at the logical level "0", which causes decrementation in the circuit CD: the value of U2 therefore decreases to approach U1.

It will hence be understood that, as soon as Tex is closed, the circuit CNA delivers a voltage U2 which, by feedback, is kept at a value which is as close as possible to U1. As soon as Tex becomes open, however, the incrementer/decrementer CD is stopped so that, for as long as Tex is open, U2 retains the last value acquired before Tex was opened.

The profile of the variation in the voltage U2 (in solid lines) is illustrated in FIG. 2. It can therefore be observed that, by latching onto the peak value of U1 (illustrated by dashes), the voltage U2 is substantially proportional to the current Iexc actually flowing through the winding FD.

It will be observed here that the voltage U2 can be used directly as the output of the circuit of the invention. In the case of an environment exposed to electromagnetic interference, however, such a signal may be falsified by such interference, or alternatively by a sudden shift in the reference earth potential which may occur in vehicles.

Furthermore, the ohmic value of the resistor R1 may vary by quite a large amount, in particular if it is produced in monolithic technology.

The device of the invention therefore advantageously comprises an output circuit 30. This circuit comprises a current generator built around an operational amplifier A3, an NPN bipolar transistor T2 and a resistor R3. On its non-inverting input, the amplifier A3 receives the voltage U2 produced by the storage circuit 20, and its inverting input is connected to the emitter of T2. The output of A3, for its part, is connected to the base of T2. The resistor R3 is mounted between the emitter of T2 and the reference earth.

The circuit 30 also comprises a selector Com and a current-mirror circuit built around MOS transistors T3 and T4, a PNP bipolar resistor T5, resistors R4 and R5 and a bipolar diode D1. More precisely, the moving contact of the selector Com is connected to the collector of T2, whereas one of its fixed contacts is connected to the cathode of D1 as well as to the base of T5. The anode of D1 is connected to the gate and the drain of T3, whose source is connected to the voltage Ualt via the resistor R4. On the other side of the current mirror, the transistor T5 has its source connected to the voltage Ualt via the resistor R5, its gate connected to the gate of T4 and its drain connected to the emitter of T5. The other fixed contact of the selector Com is connected to the collector of T5, as well as to an output terminal Sim of the device.

The output circuit 30 functions as follows. Firstly, at the collector of T2, the current-generator circuit A3, T2, R3 generates a current Is1 which is proportional to the voltage U2. Furthermore, if an ohmic value equal to that of R1 is selected for R3, then the current Is1 is substantially equal to the current Im during the phases in which Tex is closed.

When the circuit Com has its moving contact in the position illustrated by solid lines, the current mirror T3, T4, T5, D1, R4, R5 is active in order to produce at the collector of T5, and therefore on the output terminal Sim, an outgoing current Is2 which is proportional to Is1 or equal to it.

It will be noted here that the junction voltage of the diode D1 located beside T3 makes it possible to ensure identical biasing in T3 and T4, given that T4, for its part, has to experience the emitter/base junction voltage of T5.

It will also be noted that the resistors R4 and R5 are balancing resistors, making it possible to retain good proportionality or equality between the currents Is1 and Is2.

Conversely, in the event that the selector Com occupies the position indicated by dots, it is the current Is2 which is applied directly as an incoming current on the output terminal Sim.

Hence, by offering an "outgoing-current" output mode and an "incoming-current" output mode, the selector Com permits greater flexibility for interfacing the device of the invention with an existing engine-monitoring device.

As will be seen, the above device has good properties in terms of thermal compensation. In particular, the current Is1 or Is2 generated as output has excellent proportionality (or equality) with the current I1, which is itself proportional to the current in the transistor Tex.

More precisely, it will be understood that during the phases in which Tex is on, the following applies owing to the design:

U1=U2=U3

The following also applies:

U1=R1.I1 and

U3=R3.Is1

If the ratio R1/R3 is constant, then proportionality between I1 and I3 is guaranteed.

Furthermore, if R1=R3 is selected, then the following applies:

Is1=I1

Now, as regards proportionality between Im (which is substantially equal to I1) and Iex, this is guaranteed when the transistors Tex and Tm are biased in the same way and are produced with the same elementary cells on a common semiconductor substrate.

Lastly, proportionality or equality between the values of Is1 and Is2 is guaranteed by employing identically biased transistors T3 and T4 and resistors which have proportional or identical resistances, respectively.

As has been indicated, the device described above is advantageously produced in the form of a monolithic circuit, and preferably on the same semiconductor chip as the excitation regulator circuit (including, in particular, the transistor Tex and the diode DL) of the alternator or alternator/starter. In this case, the transistors fulfilling the function of current mirrors (namely Tex and Tm, on the one hand, and T3 and T4, on the other hand) are advantageously produced on the basis of the same elementary cells. Furthermore, the resistors R1 and R3, on the one hand, and R4 and R5, on the other hand, are advantageously produced so that they are exposed to the same thermal conditions.

As has been described, the circuit of FIG. 1 is capable of transmitting a signal representative of the excitation current to the engine-monitoring device in the form of a current. In this case, the engine-monitoring device has a device for analogue/digital conversion capable of deriving, from this current, a digital value which can be used in the processing operations that it carries out.

As a variant, the circuit of FIG. 1 may incorporate such an analogue/digital conversion circuit downstream of the terminal Sim, the information being in this case transmitted to the engine-monitoring device in digital form, for example according to standard digital formats or protocols such as "bit synchronous" or "LIN".

What is claimed is:

1. Alternator for a motor vehicle, comprising an excitation winding (FD), a circuit for regulating the current flowing through the excitation winding (FD) of the alternator, the said regulator circuit comprising a switch (Tex) which is controlled to be in the on mode or in the off mode and is in series with the excitation winding, and a freewheel component with one-way conduction (DL) which is connected to the terminals of the excitation winding, and a circuit (10, 20, 30) for delivering, on an output (Sim), information (Is1; Is2) representative of the state of excitation (Iexc) of the alternator, characterised in that the said circuit for delivering information representative of the state of excitation of the alternator comprises:

a means (10) for generating, while the controlled switch is in the on state, a first signal (U1) proportional to the current (Iex) flowing through the said controlled switch; and a means (20) for generating a second signal (U2), this means being capable, while the controlled switch is in the on state, of generating the second signal (U2) on the basis of the first signal (U1) and, while the controlled switch is in the off state, of generating the second signal (U2) by storing (CD) the first signal (U1) which existed before the said controlled switch was turned off.

2. Alternator according to claim 1, characterised in that the means (10) for generating the first signal comprises a current-mirror circuit (Tex, Tm) comprising a first semiconductor switch (Tex), constituting the said controlled switch, and a second semiconductor switch (TM).

3. Alternator according to claim 2, characterised in that the first and second semiconductor switches comprise first and second transistors (Tex, Tm) made from identical elementary cells.

4. Alternator according to claim 3, characterised in that the second transistor (Tm) comprises a number of elementary cells equal to a small fraction of the number of elementary cells of the first transistor (Tex).

5. Alternator according to claim 2, characterised in that the means (10) for generating the first signal furthermore comprises a means (R1) for converting the current (Im) passing through the second semiconductor switch into a voltage, the said voltage constituting the first signal (U1).

6. Alternator according to claim 1, characterised in that the means (20) for generating the second signal comprises a means (A2, CD) capable of generating digital information representative of the first signal while the controlled switch (Tex) is in the on state, and a means (R2, DZ1, CD) for selectively storing the said digital value from the moment when the controlled switch (Tex) becomes turned off.

7. Alternator according to claim 6, characterised in that the means for selectively storing the digital value comprises an incrementation/decrementation circuit (CD) which, on an input, receives a turn-off signal (EN) established on the basis of the current in the controlled switch (Tex) becoming zero.

8. Alternator according to claim 6, characterised in that the means for generating the second signal furthermore comprises a comparator (A2), which, on a first input, receives the first signal (U1) and, on a second input, receives an analogue signal (U2) obtained by conversion (CNA) of the said digital information, and whose output (Up/Dn) is addressed to an input of the said incrementation/decrementation circuit (CD) intended to determine the direction of incrementation/decrementation.

9. Alternator according to claim 1, characterised in that it furthermore comprises:
a means (30) for generating, on an output terminal (Sim), a third signal (Is1; Is2) which results from the said second signal (U2) and constitutes the said information representative of the state of excitation of the alternator.

10. Alternator according to claim 9, characterised in that the means (30) for generating the third signal comprises a means (A3, T2, R3) for converting the second signal (U2) into an output current (Is1).

11. Alternator according to claim 10, characterised in that the means (30) for generating the third signal also comprises a means (T3, T4, T5, D1, R3, R4) for converting the output current into a reverse output current (Is2), and a selector (Com) capable of selectively operating the output-current conversion means (Is1 or Is2).

12. Alternator according to claim 11, characterised in that the output-current conversion means (T3, T4, T5, D1, R3, R4) comprises a current-mirror circuit.

13. Alternator according to claim 1, characterised in that the circuit (10, 20, 30) for delivering information representative of the state of excitation of the alternator is produced monolithically.

14. Alternator according to claim 13, characterised in that the said circuit (10, 20, 30) for delivering information representative of the state of excitation of the alternator is produced monolithically with the regulator circuit (Tex, DL).

15. Alternator according to claim 2, characterised in that the current-measurement circuit (10) includes means (A1, T1) for keeping the three terminals of the excitation (Tex) and measurement (TM) transistors at respectively identical potentials.

16. Regulator circuit, comprising an excitation circuit (FD), intended to monitor the current flowing through the excitation winding (FD) of an alternator, the said regulator circuit comprising a switch (Tex) which is controlled to be in the on mode or in the off mode and is intended to be connected in series with the excitation winding, and a freewheel component with one-way conduction (DL) which is intended to be connected to the terminals of the excitation winding, and a circuit (10, 20, 30) for delivering, on an output (Sim), information (Is1; Is2) representative of the state of excitation (Iexc) of the alternator, characterised in that the said circuit (10, 20, 30) for delivering information representative of the state of excitation of the alternator comprises:
a means (10) for generating, while the controlled switch (Tex) is in the on state, a first signal (U1) proportional to the current (Iex) flowing through the said controlled switch;
a means (20) for generating a second signal (U2), this means being capable, while the controlled switch (Tex) is in the on state, of generating the second signal (U2) on the basis of the first signal (U1) and, while the controlled switch is in the off state, of generating the second signal (U2) by storing (CD) the first signal (U1) which existed before the said controlled switch (Tex) was turned off.

17. Monolithic circuit, comprising an output, intended to deliver, on the output, information representative of the state of excitation (Iex) of an alternator, the said circuit being intended to interact with a regulator circuit (Tex, DL), which is itself intended to monitor the current (Iexc) flowing through an excitation winding of the said alternator and comprises a switch (Tex) which is controlled to be in the on mode or in the off mode and is in series with the excitation winding, and a freewheel component with one-way conduction (DL) which is connected to the terminals of the excitation winding, characterised in that it comprises:
a means (10) for generating, by coupling with the controlled switch and while the latter is in the on state, a first signal (U1) proportional to the current (Iex) flowing through the controlled switch;
a means (20) for generating a second signal (U2), this means being sensitive to the on or off state of the controlled switch and being capable, while the controlled switch is in the on state, of generating the second signal (U2) on the basis of the first signal (U1) and, while the controlled switch is in the off state, of generating the second signal (U2) by storing (CD) the first signal (U1) which existed before the said controlled switch was turned off.

\* \* \* \* \*